United States Patent
Everson et al.

(10) Patent No.: US 6,949,057 B2
(45) Date of Patent: Sep. 27, 2005

(54) MULTI-FUNCTION END EFFECTOR

(75) Inventors: Curtis Everson, La Crosse, WI (US); Everett E. Jones, deceased, late of Sunnyvale, CA (US); by Michael K Jones, legal representative, Sunnyvale, CA (US); Scott Lee Rule, Black Diamond, WA (US); Maher A. Matteeka, Warren, MI (US); Arnold J. Fabris, Warren, MI (US); William M. Brunner, Jr., Rochester Hills, MI (US); Benny Granot, Huntington Woods, MI (US); Omer Einav, Kefar Monash (IL)

(73) Assignee: The Boeing Company, Chicago, IL (US)

( * ) Notice: Subject to any disclaimer, the term of this patent is extended or adjusted under 35 U.S.C. 154(b) by 205 days.

(21) Appl. No.: 10/653,491

(22) Filed: Sep. 2, 2003

(65) Prior Publication Data

US 2005/0049126 A1 Mar. 3, 2005

(51) Int. Cl.⁷ ............................................. B23Q 3/157
(52) U.S. Cl. .......................... 483/47; 483/38; 483/56; 483/3; 483/900; 29/34 B
(58) Field of Search ...................... 483/47, 38, 28–30, 483/36, 48, 50, 54–57, 900, 3; 409/134; 29/34 B, 33 K, 525.01, 525.06

(56) References Cited

U.S. PATENT DOCUMENTS

| 3,298,098 | A | * | 1/1967 | Gleisner, Jr. .................. 483/47 |
| 4,309,809 | A |   | 1/1982 | Yokoe et al. |
| 4,557,035 | A | * | 12/1985 | Rutschle et al. .............. 483/47 |
| 4,561,415 | A | * | 12/1985 | Willot .......................... 483/13 |
| 4,716,647 | A | * | 1/1988 | Winkler et al. ................ 483/38 |
| 4,723,353 | A |   | 2/1988 | Montforte |
| 4,835,838 | A |   | 6/1989 | Hirose |
| 4,928,381 | A | * | 5/1990 | Yaguchi et al. ............... 483/47 |
| 4,930,208 | A | * | 6/1990 | Winkler et al. ................ 483/3 |
| 4,995,148 | A |   | 2/1991 | Bonomi et al. |
| 5,038,466 | A |   | 8/1991 | Marozsan et al. |
| 5,372,568 | A |   | 12/1994 | Matsuoka |
| 5,482,414 | A | * | 1/1996 | Hayashi et al. ............. 409/134 |
| 6,416,450 | B2 | * | 7/2002 | Susnjara ...................... 483/47 |
| 6,428,452 | B1 | * | 8/2002 | Dahlstrom et al. ......... 29/34 B |

FOREIGN PATENT DOCUMENTS

| DE | 3503637 A | * | 8/1986 |
| DE | 3917507 A1 | * | 2/1991 |
| JP | 62-166936 A | * | 7/1987 |
| JP | 2002-096240 A | * | 4/2002 |

* cited by examiner

*Primary Examiner*—Erica Cadugan
(74) *Attorney, Agent, or Firm*—Alston & Bird LLP (57) ABSTRACT

A multi-function end effector includes a plurality of tool change mechanisms in a housing in which a spindle is also mounted for translation along an axis of the spindle. Each tool change mechanism has a gripper that releasably grips a tool holder in which a tool is mounted. The gripper of each tool change mechanism is movable between a stowed position to a tool-change position in which the gripper is coaxially aligned with the axis of the spindle for placing a tool holder held in the gripper in a position to be received by the spindle and for positioning the gripper to receive a tool holder from the spindle. The tools mounted in the tool holders include a drill bit, a countersink tool, and a fastener insertion tool. The end effector also includes a fastener feed system, a hammer device, and a sealant applicator.

25 Claims, 8 Drawing Sheets

MULTI-FUNCTION END EFFECTOR

FIELD OF THE INVENTION

The present invention relates to end effectors for mounting on the working end of a motion platform such as a robotic arm. The invention relates more particularly to end effectors having the capability to automatically change tools carried with the end effector so as to be able to perform a plurality of different work operations on a workpiece, and to end effectors operable to install blind or one-sided installation (OSI) fasteners such as blind rivets or the like.

BACKGROUND OF THE INVENTION

Various types of multi-function end effectors having a tool changing ability are known. One type of multi-function end effector has a number of tool modules each having a tool holding device coupled with a drive motor. The modules can be interchanged on a feeding block, which in turn can advance and retract a tool module for performing work operations. A drawback of this type of end effector is that a plurality of drive motors are required. In order to keep the overall size and weight of the end effector reasonably low, the drive motors must be relatively small and hence are limited in power. This type of end effector thus is best suited to fairly light work operations that do not require large machining forces.

Another known type of multi-function end effector employs an indexing tool magazine holding a plurality of tool holders that can be interchanged in a spindle of the end effector. The spindle is driven by a single drive, thus eliminating the need for a plurality of drive motors. Examples of such end effectors can be found in U.S. Pat. No. 5,372,568 to Matsuoka, U.S. Pat. No. 4,995,148 to Bonomi et al., U.S. Pat. No. 4,835,838 to Hirose, and U.S. Pat. No. 4,309,809 to Yokoe et al. The Matsuoka, Hirose, and Yokoe end effectors employ a rotary indexing tool magazine that is mounted to one side of the spindle. The magazine has a plurality of grippers each operable to releasably grip a tool holder. In the Hirose and Yokoe patents, the magazine is rotated to place a selected one of the grippers in a position in which an actuator can engage the gripper and pivotably move the gripper so as to move the tool holder into a position allowing the spindle to be moved to engage and clamp onto the tool holder. The actuator then pivots the gripper back to its starting position. The Matsuoka end effector indexes the selected gripper to a position nearest the spindle with the tool holder axis parallel to and spaced above the axis of the spindle, and then the spindle is translated upward by a drive mechanism toward the tool holder until the spindle is coaxially aligned with the tool holder. The entire tool magazine is then translated horizontally by another drive mechanism so as to insert the tool holder into the spindle. A cam arrangement connected with a draw bar of a clamping mechanism of the spindle causes the draw bar to translate upon subsequent downward translation of the spindle such that the draw bar clamps the tool holder in the spindle.

The Bonomi end effector employs a linearly movable tool magazine or shuttle that holds a plurality of tools. The shuttle is translated to index a selected one of the tools into coaxial alignment with the tool head of the end effector. The shuttle includes four stations. One station comprises a hole through which a drill mounted in the spindle of the end effector can pass for drilling a hole in a workpiece. In the other three stations are a sealant applicator for applying sealant to the hole in the workpiece, a rivet feed mechanism for feeding a rivet into a position enabling it to be inserted into the hole in the workpiece by directing a blast of compressed air through the tool head against the rivet, and a bucking bar bushing for upsetting the rivet in the hole. The drill remains mounted in the spindle throughout all of these operations, and is retracted when the sealant applicator, rivet feed mechanism, and bucking bar bushing are in use. This end effector requires access to both sides of the workpiece into which rivets are to be installed. In some applications, it may be difficult or impossible to access both sides of a workpiece.

There is a need in the art for a multi-function end effector that can install rivets or similar types of fasteners and that requires access to only one side of the workpiece.

SUMMARY OF THE INVENTION

The present invention provides a multi-function end effector for mounting on the working end of a motion platform. The end effector carries a plurality of tool change mechanisms in a housing in which a rotatable spindle is also mounted for translation along an axis of the spindle. Each tool change mechanism has a gripper that releasably grips a tool holder in which a tool is mounted. The gripper of each tool change mechanism is movable between a stowed position in which the gripper is spaced outward from the axis of the spindle, to a tool-change position in which the gripper is coaxially aligned with the axis of the spindle for placing a tool holder held in the gripper in a position to be received by the spindle and for positioning the gripper to receive a tool holder from the spindle.

In accordance with one aspect of the invention, the tool holders comprise at least a first tool holder having a rotary cutter mounted therein for drilling a hole through a workpiece, and a second tool holder in which a fastener insertion tool is mounted. The fastener insertion tool is structured and arranged to insert a blind fastener into the hole in the workpiece when the spindle is advanced. The fastener insertion tool is also operable to rotatably drive a proximal portion of the fastener adjacent an accessible side of the workpiece facing the end effector so as to expand a distal portion of the fastener adjacent an opposite side of the workpiece. Blind fasteners, also known as one-sided installation (OSI) fasteners, with which the first aspect of the invention can be practiced include rivets, bolts, and the like.

The end effector in accordance with the first aspect of the invention can also include additional devices, such as a hammer mechanism for driving a fastener through the hole in the workpiece, a sealant applicator for applying a sealant between the fastener and the hole in the workpiece, and a fastener feeding system for feeding fasteners into the end effector and installing them in the fastener insertion tool. The end effector can further include additional tool holders for other tools such as a countersink tool for countersinking the hole, or other tools.

In accordance with a second aspect of the invention, which is useful either with end effectors adapted for installing blind fasteners as in the first aspect or with end effectors for performing various other types of work operations, an end effector includes a translatable spindle and a plurality of tool change mechanisms mounted in a housing. Each tool change mechanism includes a gripper operable to releasably grip a tool holder. Each gripper is pivotable about a pivot axis that is parallel to and spaced from the axis of the spindle, such that the portion of the gripper that grips a tool holder can be moved between a stowed position spaced outward from the spindle axis and a tool-change position coaxially aligned with the spindle axis. The tool change mechanisms surround the space through which the spindle translates.

Preferably, each tool change mechanism has its own actuator for pivoting the gripper between the stowed and tool-change positions. The actuators preferably comprise rotary actuators such as pneumatic or electric rotary actuators. Pneumatic actuators are particularly preferred because of their simplicity of construction and compact size. The gripper preferably comprises a pair of opposed gripping fingers and is operable to move the fingers toward and away from each other for gripping and releasing a tool holder. The rotary actuator is operable to pivot the gripper as a unit about its pivot axis. Once the gripper grips a tool holder and the rotary actuator pivots the tool holder into coaxial alignment with the spindle, the spindle translates along its axis so as to engage the tool holder, and then the gripper is pivoted back to its stowed position.

BRIEF DESCRIPTION OF THE DRAWINGS

The above and other objects, features, and advantages of the invention will become more apparent from the following description of certain preferred embodiments thereof, when taken in conjunction with the accompanying drawings in which.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

With reference to the drawings, an end effector 30 in accordance with one embodiment of the invention is depicted in various views and performing various operations on a workpiece. The end effector 30 is capable of being used in conjunction with a motion platform such as a multi-axis machine or robot as shown in FIG. 1, which positions the end effector 30 relative to the workpiece W being worked upon.

Figures 1, 2, 3:
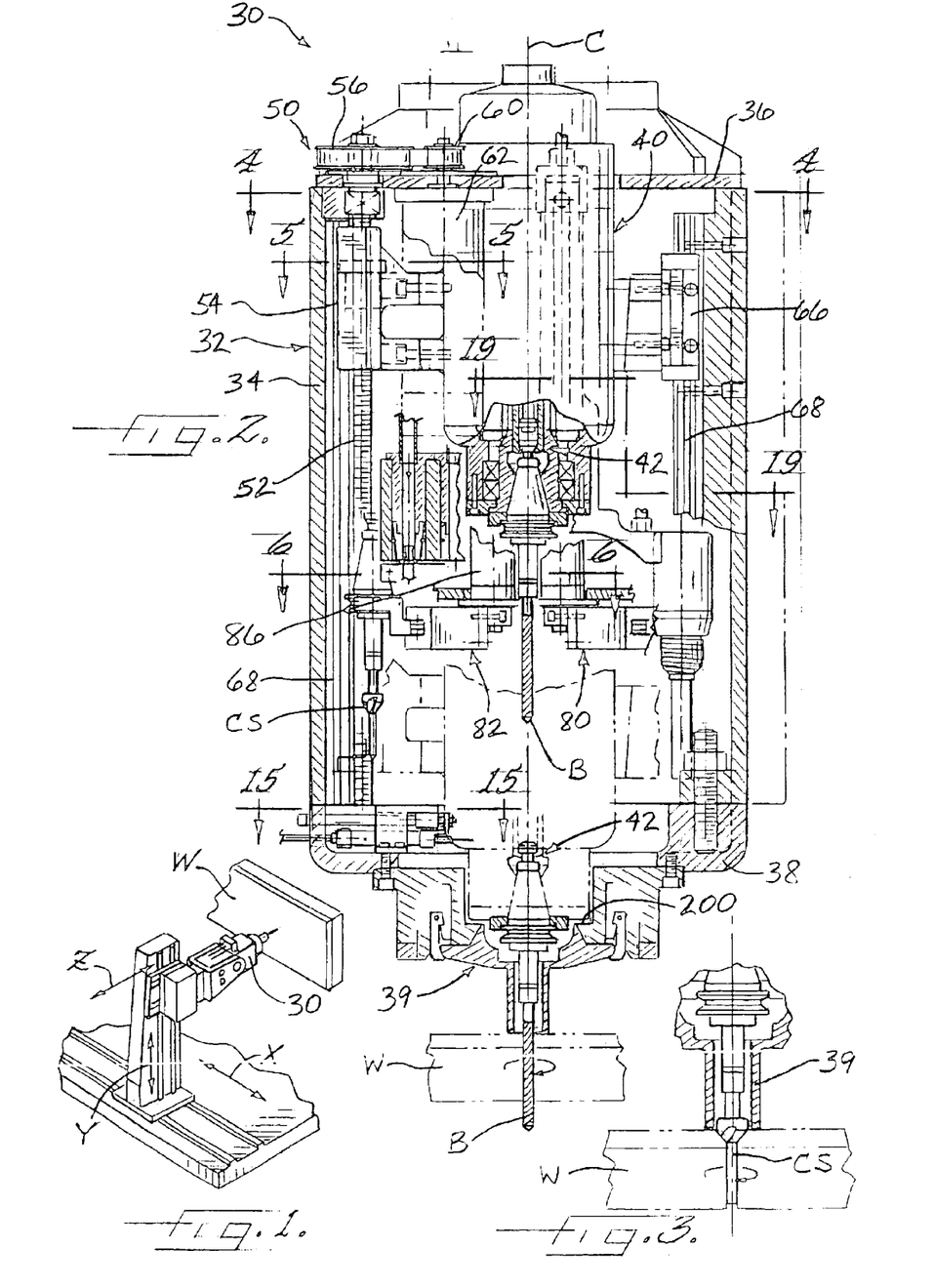
FIG. 1 is a schematic depiction of a multi-axis machine or robot positioning an end effector for working on a workpiece.
FIG. 2 is a sectioned side elevation of a multi-function end effector in accordance with one preferred embodiment of the invention, shown with a drilling tool installed in the spindle of the end effector for drilling a hole in a workpiece.
FIG. 3 is a fragmentary sectioned side elevation showing a countersink tool countersinking the hole in the workpiece.
Figure 4:
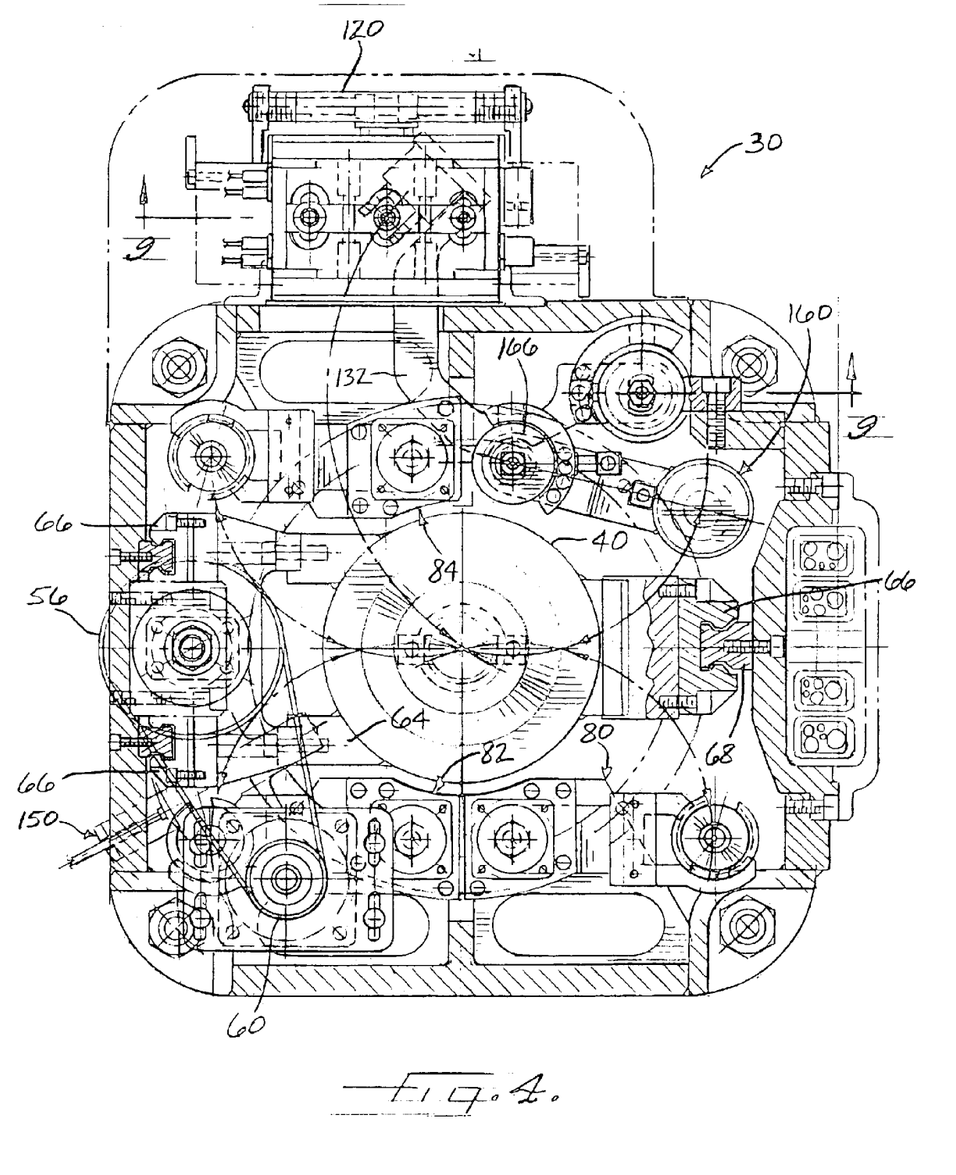
FIG. 4 is cross-sectional view of the end effector taken on the plane defined by the line 4—4 in FIG. 2.

FIG. 2 shows the end effector 30 sectioned on a plane parallel to its longitudinal centerline and FIG. 4 is a view sectioned on a plane normal to the centerline. The end effector 30 includes a housing 32 that is formed by a generally square or rectangular tubular portion 34, a top cap 36 closing the upper end of the tubular portion, and a bottom cap 38 attached to the lower end of the tubular portion. Attached to the bottom cap is a pressure foot assembly 39 that engages the surface of the workpiece and applies axial force onto the workpiece to clamp the parts of the workpiece together when performing an operation such as drilling. The housing 32 preferably includes a plurality of walls some of which can be moved or removed to gain access to the interior of the housing. Mounted in the interior of the housing 32 are a plurality of devices for performing various work operations on a workpiece.

Figure 5:
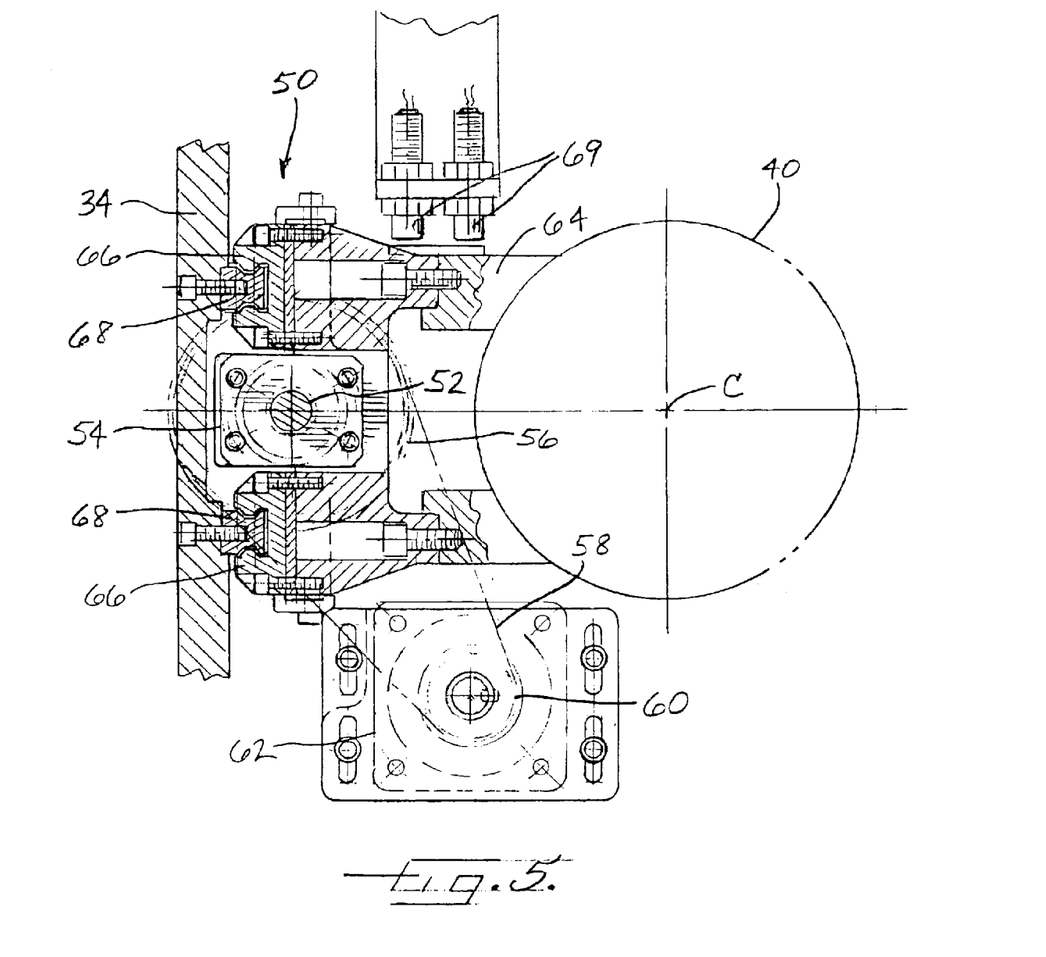
FIG. 5 is a cross-sectional view taken on the plane defined by line 5—5 in FIG. 2, showing details of the spindle feed mechanism.

More particularly, the end effector includes a spindle mechanism 40 of generally conventional type operable to rotatably drive and translationally advance and retract various tools held in the spindle. The spindle mechanism 40 is shown partially broken away in FIG. 2 to reveal details of the tool-gripping mechanism employed by the spindle for gripping tool holders, as further described below. The spindle 40 defines a longitudinal centerline C along which a tool is positioned coaxially when held in the spindle. The spindle 40 is advanced and retracted along the centerline C by a spindle feed mechanism 50, shown in greater detail in FIG. 5. The spindle feed mechanism 50 includes an externally threaded ball screw 52 or the like rotatably mounted in the housing 32 parallel to the centerline C and adjacent one wall of the housing. An internally threaded nut mechanism 54 engages the ball screw 52 such that rotation of the ball screw clockwise or counterclockwise in FIG. 5 relative to the nut mechanism 54 causes the nut mechanism to be translated upward or downward in FIG. 2. The ball screw 52 is attached to a shaft at its upper end, which projects up through the upper end of the housing and has a driven sprocket or pulley 56 mounted thereon. The driven pulley 56 is rotatably driven by a belt 58 looped therearound, which belt is driven by a drive pulley 60 mounted on a drive shaft connected with a drive motor 62 attached to the underside of the top cap 36 of the housing 32.

Affixed to the nut mechanism 54 is a spindle support structure 64 that is affixed to the outer housing of the spindle 40. The spindle support structure 64 includes a pair of guides 66 that extend parallel to and generally on opposite sides of the ball screw 52 adjacent the wall of the housing portion 34. The guides 66 slidably engage a pair of guide rails 68 that are affixed to the wall of the housing portion 34 and extend parallel to the axis of the ball screw 52. On the opposite side of the spindle 40 from the ball screw and nut mechanism, another guide 66 is affixed to the spindle and another guide rail 68 is affixed to the wall of housing adjacent thereto. The guides 66 and cooperating guide rails 68 guide the movement of the spindle 40 back and forth along the centerline C. Thus, operation of the drive motor 62 in one rotational direction or the other causes the spindle 40 to be advanced or retracted in the housing 32 along the centerline of the spindle. The end effector includes proximity sensors 69 (FIG. 5) for sensing when the spindle 40 is in certain positions such as a retracted position and/or an extended position, to facilitate control of the spindle operation.

Figures 6, 7, 8:
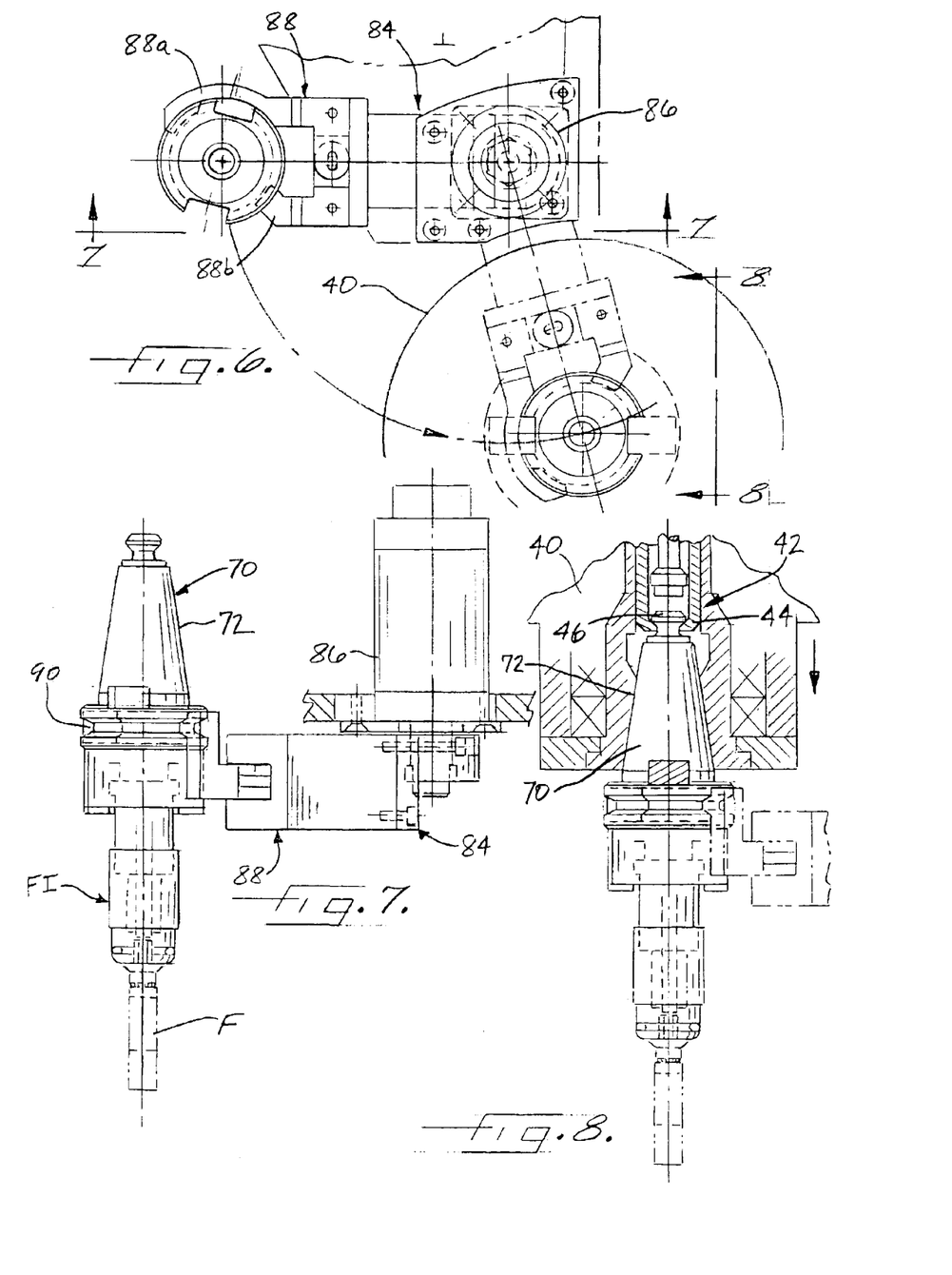
FIG. 6 is a view along the direction defined by the line 6—6 in FIG. 2, showing one of the tool change mechanisms being rotated to place a tool holder holding a fastener insertion tool at the centerline of the spindle.
FIG. 7 is a view of the tool change mechanism in the direction defined by the line 7—7 in FIG. 6, showing the tool change mechanism's gripper grasping tool holder for the fastener insertion tool.
FIG. 8 is a view of the tool change mechanism in the direction defined by the line 8—8 in FIG. 6, showing the drill spindle engaging the tool holder with the fastener insertion tool held therein.

As shown in FIG. 2 and FIG. 8, the spindle 40 includes a drawbar assembly 42 having a plurality of spring-biased, pivotal fingers 44 mounted within a recess of the drawbar assembly. A drive device (not shown) is operable to advance the fingers 44 outwardly from the recess into a larger-diameter recess, which allows the fingers to be spread radially out away from one another so that a retention knob 46 of a tool holder 70 can be received and grasped between the fingers. The drive device then retracts the fingers 44, which causes the fingers to move radially inward and firmly grip the retention knob, and the tool holder 70 is retracted so that a conical seating surface 72 of the tool holder is received into and seats into a conical recess of the drawbar assembly, thus firmly fixing the tool holder 70 in the spindle.

The end effector 30 also includes a plurality of tool change mechanisms mounted within the housing 32. Each tool change mechanism is operable to releasably grip a tool holder 70 in which a tool is mounted, and each tool holder has a different type of tool mounted therein. A first tool change mechanism 80 (FIG. 2) is used for manipulating a tool holder 70 in which a drill bit B is held; in FIG. 2, the tool holder with the drill bit has already been installed in the spindle 40 and hence the tool change mechanism 80 is empty. A second tool change mechanism 82 is used for manipulating a tool holder 70 in which a countersink tool CS is held. A third tool change mechanism 84 is used for manipulating a tool holder 70 in which a fastener insertion tool FI is held. Each of the tool change mechanisms 80, 82, 84 is operable to move its respective tool holder 70 from a stand-by or stowed position laterally outward of the centerline of the spindle, to a centered position coaxial with the centerline of the spindle so that the spindle can grip the tool holder.

The several tool change mechanisms are essentially identical in form and function and thus only the tool change mechanism 84 for the fastener insertion tool FI is shown and described in detail. With reference to FIGS. 6–8, the tool change mechanism 84 comprises a rotary actuator 86 that is mounted at a position spaced laterally outward from the longitudinal centerline of the spindle 40, as best seen in FIG. 6. The rotary actuator 86 carries a gripper 88 comprising a pair of opposed gripping fingers 88a and 88b. The gripper 88 preferably is pneumatically operated to cause the fingers 88a and 88b to move toward and away from each other for gripping and releasing a tool holder 70. Alternatively, the gripper 88 could be operated by other than pneumatic power, such as by electrical or hydraulic power. The fingers 88a and 88b are configured to engage a circumferential groove 90 formed in the outer surface of the tool holder 70 so that the gripper 88 can positively grip and exert an axial force on the tool holder. The rotary actuator 86 is operable to pivot the entire gripper 88 clockwise and counterclockwise about the pivot axis of the actuator through a predetermined range of angular movement.

FIG. 6 in solid lines illustrates the tool change mechanism 84 in a stowed position in which the gripper 88 is pivoted so as to place the tool holder 70 held in the gripper in a position spaced laterally outward of the centerline of the spindle 40. All of the tool change mechanisms 80, 82, 84 are placed in their stowed positions to enable the spindle 40 to be advanced in a forward direction in the housing (i.e., downward in FIG. 2) such that a tool held in the spindle is extended out from the forward end of the housing to engage a workpiece. The phantom lines in FIG. 6 show the rotary actuator 84 having pivoted the gripper 88 so as to move the tool holder 70 into a position coaxial with the centerline of the spindle 40.

The spindle 40 is placed in a retracted position in order to change the tool held in the spindle. In a retracted position, the groove 90 in the tool holder 70 that is mounted in the spindle is in axial alignment with the fingers 88a,b of an empty one of the grippers 88. A tool change operation is performed as follows: With the spindle in the retracted position, the empty gripper 88 is activated to move the fingers 88a,b apart for receiving the tool holder mounted in the spindle. It will be noted in FIG. 6 that the finger 88a that is farther away from the spindle is relatively long while the finger 88b closer to the spindle is relatively short. The shorter finger 88b is moved away from the longer one a sufficient distance so that the finger 88b will clear the tool holder 70 held in the spindle when the gripper 88 is pivoted by the rotary actuator 86 into the tool-change position. The gripper 88 is pivoted to its tool-change position, the tool holder 70 in the spindle thus being received between the fingers 88a,b. The fingers 88a,b are then closed about the tool holder 70. Next, the drawbar assembly 42 of the spindle is operated to release its grip on the retention knob 46 of the tool holder 70, and the spindle 40 is further retracted such that the tool holder 70 is fully withdrawn from the spindle. The gripper 88 with the tool holder held therein is then pivoted back to its stowed position.

A new tool holder is then installed into the spindle by essentially reversing the above-described removal process. Thus, a different one of the grippers 88 that holds a tool holder 70 to be installed into the spindle is pivoted into its tool-change position in which the tool holder is coaxially aligned with the spindle, and the spindle is advanced to cause the tool holder to be inserted into the drawbar assembly 42 of the spindle. The drawbar assembly 42 is operated to grasp the tool holder. The gripper 88 is then operated to open the fingers 88a,b to release their grip on the tool holder, and the gripper is pivoted back to its stowed position. The spindle can then be advanced to engage the tool with the workpiece.

Figures 19, 20, 21, 22:
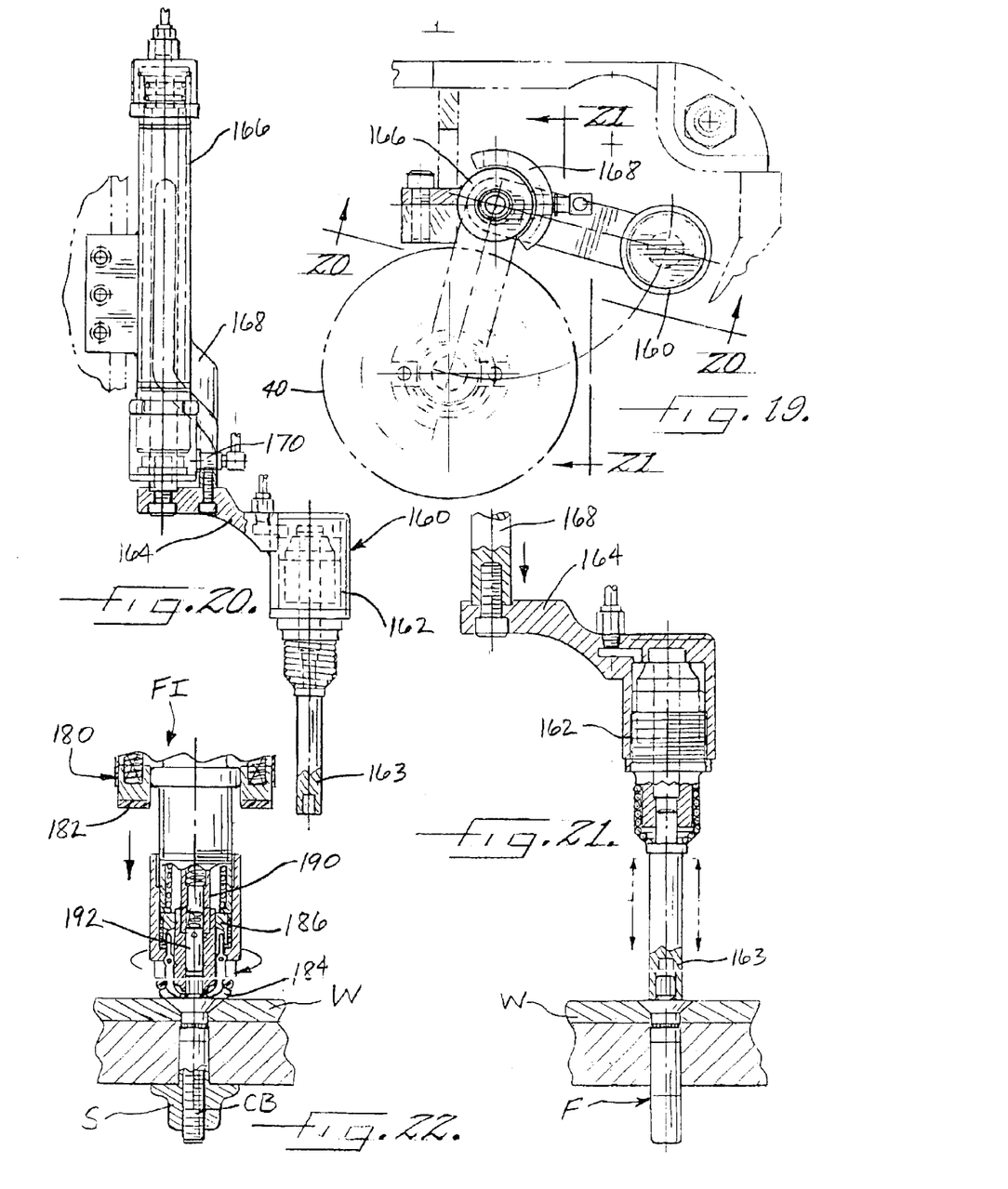
FIG. 19 is view taken substantially along 19—19 in FIG. 2, showing the hammer device in a retracted position in solid lines, and in a rotated position in phantom lines positioning the hammer at the centerline of the spindle.
FIG. 20 is a view along 20—20 in FIG. 19, showing the hammer device in the retracted position.
FIG. 21 is a cross-sectional view along 21—21 in FIG. 19, showing the hammer extended and hammering the fastener into the hole in the workpiece.
FIG. 22 is a detailed cross-sectional view of the fastener insertion tool engaging the fastener and rotating the fastener drive head to cause the expandable portion of the fastener to expand on the back side of the workpiece.

The tool holders 70 can hold various types of tools depending on the types of work operations to be performed on a workpiece. In one embodiment of the invention, as previously noted, the end effector is adapted to install one-sided installation (OSI) fasteners such as blind rivets into a workpiece. Accordingly, one tool holder manipulated by the tool-change mechanism 80 has a drill bit B mounted therein for drilling a hole through the workpiece. Another tool holder manipulated by the tool-change mechanism 82 holds a countersink tool CS for countersinking the hole, and a third tool holder manipulated by the tool-change mechanism 84 mounts a fastener insertion tool FI that is operable to grasp an OSI fastener F and insert it partway into the hole drilled through the workpiece. The fastener F can be a blind rivet having a core bolt CB that is rotatably connected to an expandable sleeve S (FIG. 22). The core bolt has an enlarged head end with a drive head or the like that is engaged by the fastener insertion tool FI and a substantially cylindrical section of smaller diameter that depends from the head end and includes the sleeve S. Rotation of the core bolt CB with the sleeve S held stationary causes the sleeve to expand radially outwardly, thus forming an upset portion or bulb on the back side (i.e., an inaccessible side) of the workpiece as shown in FIG. 22.

Figure 12:
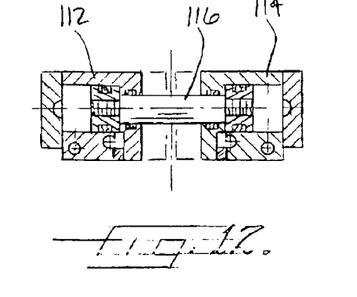
FIG. 12 is a cross-sectional view on plane 12—12 in FIG. 10, showing details of the mechanism that clamps a fastener and indexes the fastener to the pick-up station.

A fastener is installed into the fastener insertion tool FI by employing a fastener feed system 100 that works in conjunction with a fastener transfer mechanism 130, illustrated in detail in FIGS. 9–14. The fastener feed system 100 includes at least one fastener supply unit 102 remote from the end effector 30 and operable to transport fasteners one at a time through a feed conduit to a fastener receiver unit mounted on the end effector. Preferably, fasteners of more than one size can be delivered to the fastener receiver unit. Thus, in the illustrated embodiment, there are three fastener supply units 102 feeding fasteners through respective feed conduits 104a, 104b, 104c to the fastener receiver unit 106. The receiver unit 106 includes a feed block 108 having three feed passages for the three sizes of fasteners, each passage having an escapement at an exit end of the passage. Fasteners fed through the feed passages of the feed block 108 are received into a fastener clamping assembly 110 that includes a pair of opposed clamp blocks 112, 114 each of which defines three generally semi-cylindrical recesses aligned with like recesses in the opposite clamp block and sized to grip the three different sizes of fasteners fed into the receiver unit. The clamp blocks 112, 114 are movable toward and away from each other for clamping and releasing fasteners therebetween. The clamp blocks each define a pair of spaced cylindrical bores transversely extending therein (i.e., in a direction from one clamp block toward the other), and the opposite ends of a pair of pistons 116 are received in the cylindrical bores as shown in FIG. 12. Air supply lines 118 feed air through passages formed in the clamp blocks 112, 114 to either one side or the other side of the heads of the pistons 116 in order to move the clamp blocks either toward or away from each other. The entire fastener receiver unit 106 is translatable in a side-to-side direction (left to right in FIGS. 9 and 10) by virtue of being slidably mounted on a guide cylinder 120, and the side-to-side movement of the receiver unit is controlled by a suitable actuator (not shown) so as to position any of the fasteners held in the fastener clamp assembly 106 in a pick-up position so that the fastener transfer mechanism 130 can retrieve the fastener and install it in the fastener insertion tool FI.

Figure 9:
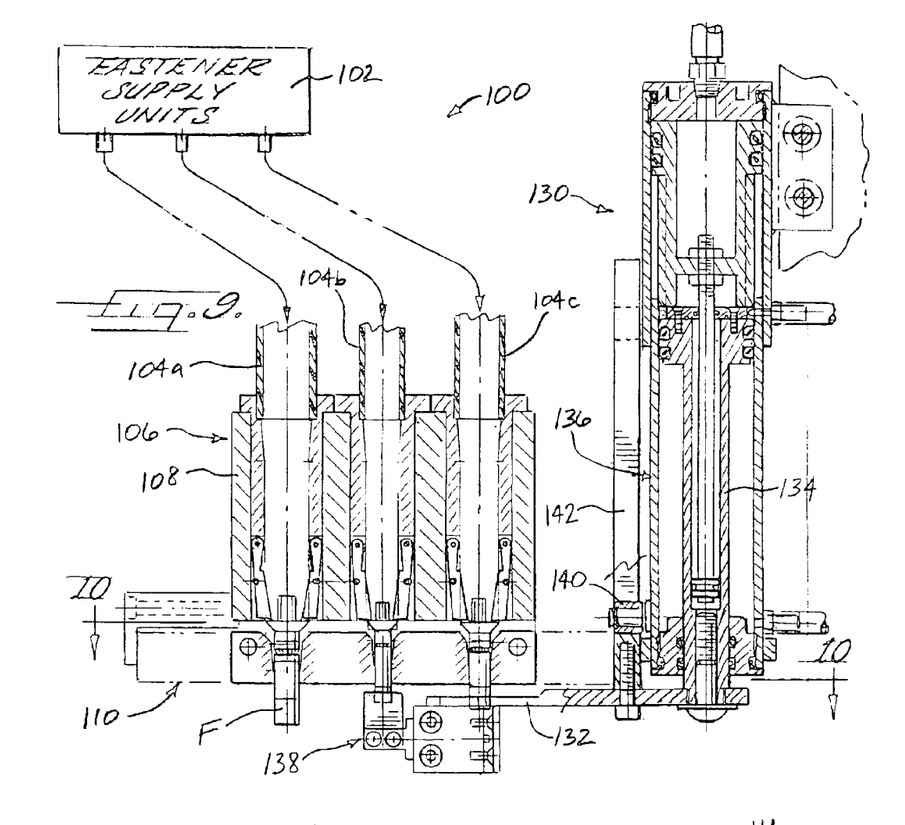
FIG. 9 is a cross-sectional view on the plane defined by the line 9—9 in FIG. 4, showing details of the fastener feed system for the end effector.

The fastener transfer mechanism 130 includes a transfer arm 132 that is rotatably connected at one end thereof to a piston rod 134 of a pneumatic cylinder 136 mounted in the housing of the end effector such that the direction of movement of the piston rod 134 is parallel to the spindle centerline. The opposite end of the transfer arm 132 carries a gripping device 138 operable to releasably grip a fastener held in the pick-up position of the fastener receiver unit 106. A cam roller 140 is mounted on the cylinder portion of the pneumatic cylinder 136 and a cam plate 142 is affixed to the transfer arm 132 and defines a cam track in which the cam roller rides. The cam track is shaped to impart rotation to the transfer arm 132 about the axis of the piston rod 134 when the piston rod is extended and retracted in the cylinder 136. In particular, the cam track is configured so that the transfer arm 132 is rotated between a pick-up position shown in solid lines and a delivery position shown in phantom lines in FIG. 10. In the pick-up position of the transfer arm 132, the gripping device 138 on the free end of the transfer arm is aligned with a fastener positioned in the pick-up position by the clamp blocks of the fastener receiver unit. In the delivery position of the transfer arm, the fastener gripped in the gripping device 138 is coaxial with the centerline of the spindle 40. The cam track in the cam plate 142 has a lower axial portion 144 that allows the transfer arm and gripping device to be moved purely axially with no rotation when the arm is in its upper position proximate the fastener receiver unit 106 as shown in FIG. 9, so that the gripping device can engage a fastener held in the clamp blocks. Once the gripping device has gripped the fastener, the clamp blocks are moved apart to release the fastener from the receiver unit so that the transfer arm can be translated downward in FIG. 9. The cam track in the cam plate 142 has a non-axial portion 146 that imparts rotation to the transfer arm 132 after the arm has been lowered a certain amount, so as to align the fastener with the centerline of the spindle in which the fastener insertion tool FI has been installed for receiving the fastener.

Figures 10, 13, 14:
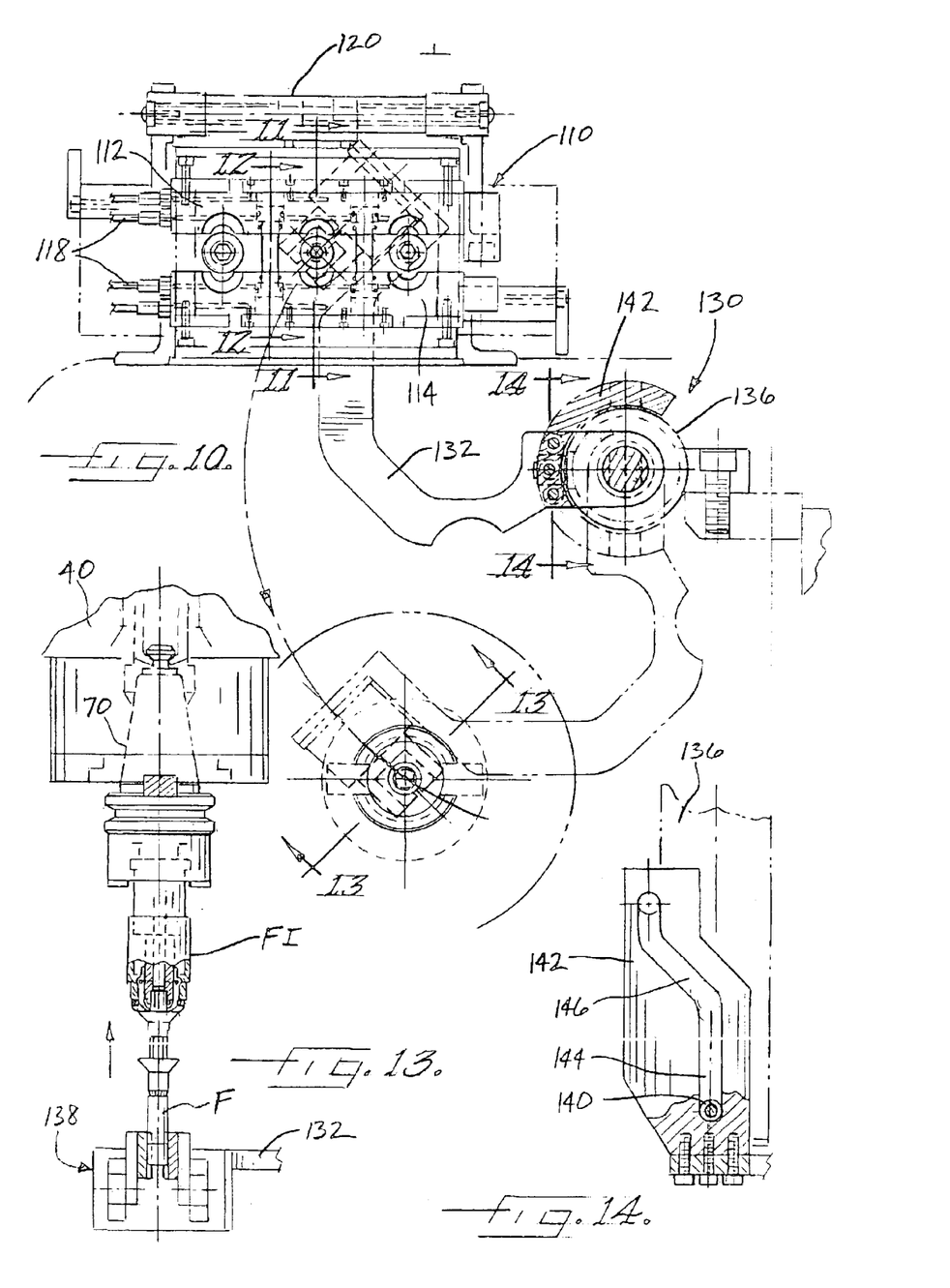
FIG. 10 is a view of the fastener feed system along the direction defined by the line 10—10 in FIG. 9, showing how the fastener pick-up mechanism retrieves a fastener from the fastener pick-up station and rotates the fastener to the spindle centerline for gripping by the fastener insertion tool.
FIG. 13 is a cross-sectional view on plane 13—13 in FIG. 10, showing a fastener being delivered to the fastener insertion tool.
FIG. 14 is a fragmentary view in the direction defined by line 14—14 in FIG. 10, showing a developed view of the cam track for the rotary actuator of the fastener transfer mechanism.
Figure 11:
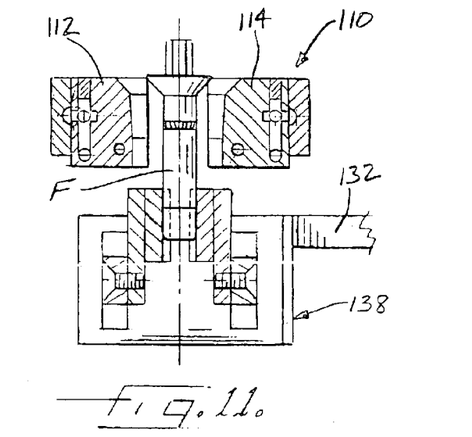
FIG. 11 is a cross-sectional view through the fastener feed mechanism on plane 11—11 of FIG. 9, showing the fastener transfer mechanism clamped onto a fastener at the fastener pick-up station.

FIG. 13 shows the end of the transfer arm 132 and the gripping device 138 after the transfer arm has been fully lowered so that the cam roller 140 is at the upper end of the cam track as shown in phantom lines in FIG. 14. In this position, the fastener is spaced below the lower end of the fastener insertion tool FI in the spindle. The transfer arm 132 can then be moved up to insert the upper end of the fastener into the fastener insertion tool, or alternatively the spindle can advance the fastener insertion tool to accomplish the same result. The arm is then moved back down, or the spindle is retracted back, a sufficient distance to completely disengage the gripping device 138 from the fastener so that the transfer arm 132 can be returned to its stowed position. The spindle is then advanced toward the forward end of the housing in preparation for inserting the fastener into the hole previously drilled in the workpiece with the drill bit B and countersunk with the countersink tool CS.

Figures 15, 16, 17, 18:
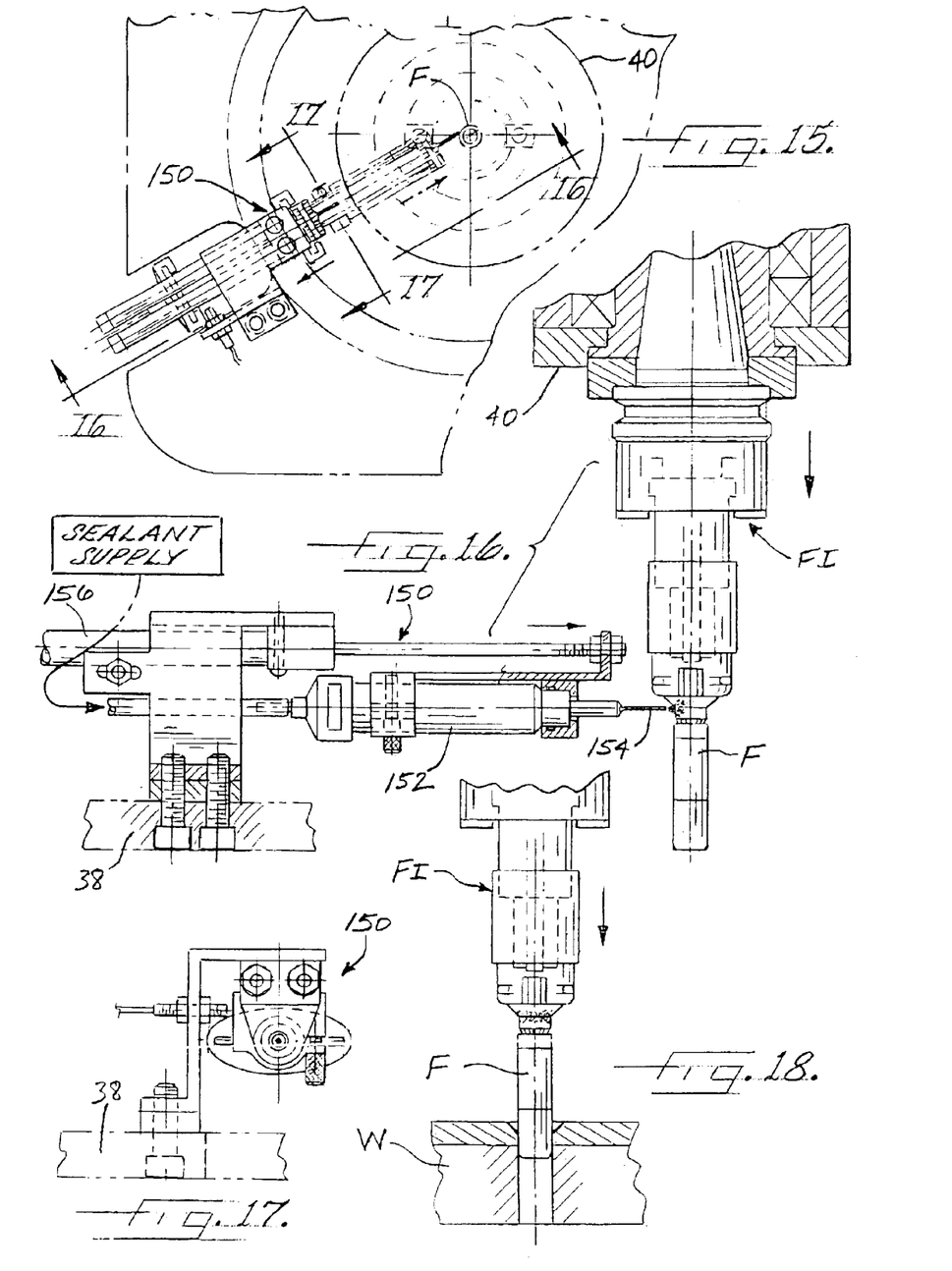
FIG. 15 is a view in the direction defined by line 15—15 in FIG. 2, showing the sealant applicator in a retracted position in solid lines, and in an advanced position in phantom lines, applying sealant to a fastener held in the fastener insertion tool.
FIG. 16 is a view of the sealant applicator in the direction defined by line 16—16 in FIG. 15.
FIG. 17 is a view of the sealant applicator in the direction defined by line 17—17 in FIG. 15.
FIG. 18 is a side elevation showing the fastener insertion tool inserting the fastener into the hole in the workpiece.

Before the fastener is inserted into the hole in the workpiece, it is desirable in some cases to apply a liquid sealant to the surfaces of the fastener that will engage the inner surfaces of the hole and countersink formed in the workpiece. For this purpose, the end effector includes a sealant applicator 150 depicted in FIGS. 15–17. The sealant applicator comprises a powered syringe 152 and applicator needle 154, such as the 1500XL sealant dispenser available from EFD, Inc. of East Providence, R.I., mounted on the bottom cap 38 of the housing for sliding movement toward and away from the centerline of the spindle 40. The syringe and needle are advanced by a suitable actuator such as a pneumatic cylinder 156 until the end of the needle is proximate the head of the fastener as shown in FIG. 16, and a quantity of sealant is applied to the head; the spindle can rotate during the application so that sealant is applied all the way around the fastener head. After the sealant has been applied, the syringe and needle are retracted as shown in solid lines in FIG. 15. The spindle then advances the fastener out the forward end of the housing and inserts the fastener partway into the hole in the workpiece as shown in FIG. 18. The spindle is then retracted.

Preferably, the hole drilled in the workpiece is sized to provide a tight or slight interference fit between the fastener and the workpiece. Accordingly, the fastener requires some appreciable force to fully insert it into the hole. The end effector includes a hammer device 160 mounted in the housing 32 and operable to hammer a partially inserted fastener F fully into the hole in the workpiece.

FIGS. 19–21 show the hammer device 160 in detail. The hammer device 160 includes a pneumatic impact hammer 162 having an impact tool 163 for impacting the enlarged head portion of the fastener installed in the workpiece. The hammer 162 is mounted on one end of an arm 164 whose opposite end is rotatably mounted on the piston rod of a pneumatic cylinder 166. The arm 164 is affixed to a cam plate 168 that has a cam track formed therein, and a cam roller 170 affixed to the cylinder portion of the pneumatic cylinder is engaged in the cam track. The cylinder 166 is mounted in the housing 32 of the end effector at a position radially offset from the axis of the spindle 40 as can be seen in FIG. 19. The hammer 162 when not being used is held in a stand-by position radially outward from the axis of the spindle as shown in solid lines in FIG. 19. When the hammer is to be operated, extension of the piston of the cylinder 166 causes the roller 170 to roll along the cam track in the cam plate 168, which causes the hammer 162 to be rotated about the axis of the cylinder 166 until the hammer is in alignment with the axis of the spindle as shown in phantom lines in FIG. 19; then, further extension of the piston causes the impact tool 163 of the hammer 162 to be advanced out the forward end of the housing to engage the fastener installed in the hole in the workpiece as shown in FIG. 21. The hammer 162 is operated to repeatedly impact the fastener to drive it fully into the hole in the workpiece. The hammer 162 is then retracted back to its stand-by position.

Once the fastener has been hammered into the hole, the spindle is again advanced, still holding the fastener insertion tool FI, so as to engage the drive head of the fastener. The fastener insertion tool is rotated by the spindle so as to rotate the drive head of the fastener, which is attached to the core bolt, and the rotation of the core bolt causes the sleeve S to expand on the back side of the workpiece as shown in FIG. 22. In order to allow the core bolt to rotate to expand the sleeve, the sleeve must be held stationary. In some cases, this can be accomplished by providing an interference fit of the fastener into the hole. However, in other cases there may not be an interference fit.

Thus, to hold the sleeve stationary, the fastener insertion tool FI is designed to provide a braking action. More particularly, with reference to FIG. 22, the insertion tool comprises an outer stationary braking portion 180 that coaxially surrounds an inner rotating fastener drive portion 190. The braking portion includes a brake ring 182 that is urged against an annular high-friction surface 200 of the pressure foot assembly 39 (FIG. 2) when the spindle advances the fastener insertion tool to engage a fastener inserted in the workpiece. Accordingly, the friction between the brake ring and the pressure foot assembly (which is stationary) holds the braking portion 180 of the fastener insertion tool stationary. The braking portion also includes a plurality of pivotal fastener head-engaging fingers 184 that are operable to pivot radially outward and engage recesses (not shown) in the enlarged head portion of the fastener F when urged radially outward by a piston 186 that is moved toward the fastener by the axial force exerted on the fastener insertion tool against the pressure foot by the spindle. By virtue of the fingers 184 engaged in the fastener head recesses, the fastener head is prevented from rotating with the drive head of the fastener. The spindle then rotates the rotatable drive portion 190 of the fastener insertion tool so as to rotate the drive head. If desired, the fastener can be designed so that the drive head shears off when a predetermined amount of torque is applied to it, and the fastener insertion tool can shear off the drive head and then eject it from the insertion tool when the tool is retracted. The rotatable drive portion 190 includes a spring-biased ejector pin 192 that is biased against the drive head of the fastener to insure that the head is ejected from the insertion tool after the head is sheared off and the insertion tool is retracted by the spindle. The fastener insertion tool preferably includes a clutch mechanism (not shown) that is operable to allow rotation of the drive portion relative to the braking portion.

As previously noted, the pressure foot 39 of the end effector is urged against the workpiece to apply an axial pre-load on the workpiece, which is particularly important when drilling a hole through a workpiece comprising two or more separate portions stacked together. By pre-loading the stack-up with the correct amount of force, it is possible to prevent burrs from being formed at interior surfaces of the layers of the stack-up; in other words, the stack-up behaves as if it were one integral structure rather than a plurality of separate layers.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A multi-function end effector for mounting at a working end of a motion platform, the end effector comprising:

a housing;

a rotatable spindle mounted in an interior of the housing, the spindle having a recess for receiving a tool holder and a tool-gripping assembly operable to releasably grip the tool holder to fix the tool holder in the spindle;

a spindle feed mechanism connected with the spindle and operable to impart translational motion to the spindle along an axis of the spindle for advancing and retracting the spindle such that a tool held in the tool holder is axially advanced and retracted, advancement of the spindle causing the tool to extend out from the housing for engaging a workpiece to be operated upon, retraction of the spindle causing the tool holder and tool to be withdrawn into the interior of the housing;

a plurality of tool change mechanisms mounted in the housing, each tool change mechanism having a gripper operable to releasably grip a tool holder having a tool mounted therein and being operable to move from a stowed position in which the gripper is spaced outward from the axis of the spindle, to a tool-change position in which the gripper is coaxially aligned with the axis of the spindle for placing a tool holder held in the gripper in a position to be received by the spindle or for positioning the gripper to receive a tool holder from the spindle; and a plurality of tool holders each having its own dedicated tool change mechanism, the tool holders comprising at least a first tool holder having a rotary cutter mounted therein for drilling a hole through a workpiece, and a second tool holder in which is mounted a fastener insertion tool structured and arranged to insert a blind fastener into the hole in the workpiece when the spindle is advanced and to rotatably drive one portion of the fastener adjacent an accessible side of the workpiece facing the end effector so as to expand another portion of the fastener adjacent an opposite side of the workpiece.

2. The multi-function end effector of claim 1, further comprising a third tool holder in which a countersinking tool is mounted for countersinking the hole in the workpiece.

3. The multi-function end effector of claim 1, further comprising a hammer mechanism mounted in the housing for driving the fastener through the hole in the workpiece after the fastener has been partially inserted into the hole by the fastener insertion tool.

4. The multi-function end effector of claim 3, wherein the hammer mechanism comprises an impact hammer mounted on an arm that is rotatably and translationally movable within the housing for moving the impact hammer between a stand-by position inside the housing spaced outward of the axis of the spindle, and an active position in which a fastener-engaging portion of the impact hammer is coaxial with the axis of the spindle and extends out from the housing to engage a fastener inserted into a hole in the workpiece.

5. The multi-function end effector of claim 4, wherein the arm is rotatably attached at one end thereof to a piston rod of a fluid-operated cylinder that imparts translational movement to the arm.

6. The multi-function end effector of claim 5, wherein the arm is rotated by a cam arrangement as the arm is translated.

7. The multi-function end effector of claim 1, wherein the gripper of each tool change mechanism comprises a pair of opposed gripping fingers movable toward and away from each other for gripping one of the tool holders therebetween.

8. The multi-function end effector of claim 1, further comprising a sealant applicator device mounted in the housing and operable to apply a sealant to the fastener prior to the fastener being inserted into the hole in the workpiece.

9. The multi-function end effector of claim 1, wherein each tool change mechanism pivots about a pivot axis for moving the gripper between the stowed position and the tool-change position.

10. The multi-function end effector of claim 9, wherein the pivot axis of each tool change mechanism is parallel to the axis of the spindle.

11. The multi-function end effector of claim 10, wherein each gripper has its own rotary actuator for pivoting the gripper about the pivot axis, each rotary actuator being mounted in a fixed located in the housing.

12. The multi-function end effector of claim 1, further comprising a fastener feed system for feeding fasteners into the end effector and installing a fastener into the fastener insertion tool.

13. The multi-function end effector of claim 12, wherein the fastener feed system includes a fastener supply unit remote from the end effector and a fastener receiver unit mounted on the end effector, the supply unit transporting fasteners one at a time through a feed conduit to the receiver unit.

14. The multi-function end effector of claim 13, wherein the fastener feed system further comprises a fastener transfer mechanism that retrieves a fastener from the fastener receiver unit and moves the fastener into a position for engagement in the fastener insertion tool.

15. The multi-function end effector of claim 14, wherein the fastener transfer mechanism includes a transfer arm rotatably and translationally movable within the housing and carrying a gripping device at one end of the transfer arm for releasably gripping a fastener and moving the fastener from the receiver unit to the fastener insertion tool.

16. The multi-function end effector of claim 15, wherein the transfer arm is translated by a fluid-operated cylinder and is rotated by a cam arrangement.

17. The multi-function end effector of claim 14, wherein the fastener receiver unit is structured and arranged to receive a plurality of different-sized fasteners in designated receptacles of the receiver unit.

18. The multi-function end effector of claim 17, wherein the receiver unit is operable to shuttle back and forth to move a fastener disposed in any of the receptacles to a pick-up location from which the fastener can be retrieved by the fastener transfer mechanism.

19. A multi-function end effector for mounting at a working end of a motion platform, the end effector comprising:

a housing;

a spindle mounted in an interior of the housing, the spindle having a recess for receiving a tool holder and a clamping assembly operable to releasably grip the tool holder to fix the tool holder relative to the spindle;

a spindle feed mechanism connected with the spindle and operable to impart translational motion to the spindle along an axis of the spindle for advancing and retracting the spindle such that a tool held in the tool holder is axially advanced and retracted, advancement of the spindle causing the tool to extend out from the housing for engaging a workpiece to be operated upon, retraction of the spindle causing the tool holder and tool to be withdrawn into the interior of the housing;

a plurality of tool change mechanisms mounted in the housing, each tool change mechanism having a gripper operable to releasably grip a tool holder having a tool mounted therein and being operable to pivot about a pivot axis from a stowed position in which the gripper is spaced outward of the axis of the spindle, to a tool-change position in which the gripper is aligned with the axis of the spindle for placing a tool holder held in the gripper in a position to be received by the spindle and for positioning the gripper to receive a tool holder from the spindle, the pivot axis of each tool-change mechanism being parallel with the axis of the spindle; and a plurality of tool holders each having a different tool mounted therein, each tool holder having its own dedicated tool change mechanism.

20. The multi-function end effector of claim 19, wherein the tool change mechanisms and tool holders comprise at least a first tool change mechanism and first tool holder having a rotary cutter mounted therein for drilling a hole through a workpiece, and a second tool change mechanism and second tool holder in which is mounted a fastener insertion tool structured and arranged to insert a fastener into the hole in the workpiece when the spindle is advanced.

21. The multi-function end effector of claim 20, wherein the fastener insertion tool is structured and arranged to insert a blind fastener into the hole in the workpiece when the spindle is advanced and to rotatably drive one portion of the fastener adjacent an accessible side of the workpiece facing the end effector so as to expand another portion of the fastener adjacent an opposite side of the workpiece.

22. The multi-function end effector of claim 21, further comprising a hammer mechanism for driving the fastener through the hole in the workpiece after the fastener has been partially inserted into the hole by the fastener insertion tool.

23. The multi-function end effector of claim 22, further comprising a third tool change mechanism and third tool holder in which a countersink tool is mounted for countersinking the hole in the workpiece.

24. The multi-function end effector of claim 19, wherein each tool change mechanism includes a rotary actuator, the rotary actuators being mounted in fixed locations in the housing.

25. The multi-function end effector of claim 24, wherein the spindle is arranged to pass between the rotary actuators when the spindle is advanced to place the tool held in the spindle in engagement with the workpiece.

* * * * *